(12) United States Patent
Reeder

(10) Patent No.: US 12,006,759 B1
(45) Date of Patent: Jun. 11, 2024

(54) REMOTE WIRE GATE APPARATUS

(71) Applicant: Robert Reeder, Cardston (CA)

(72) Inventor: Robert Reeder, Cardston (CA)

( * ) Notice: Subject to any disclaimer, the term of this patent is extended or adjusted under 35 U.S.C. 154(b) by 96 days.

(21) Appl. No.: 17/745,059

(22) Filed: May 16, 2022

Related U.S. Application Data

(60) Provisional application No. 63/208,566, filed on Jun. 9, 2021.

(51) Int. Cl.
| | |
|---|---|
| *E06B 11/02* | (2006.01) |
| *B66D 1/46* | (2006.01) |
| *B66D 1/74* | (2006.01) |
| *E04H 17/04* | (2006.01) |
| *E05F 15/627* | (2015.01) |
| *H04N 7/18* | (2006.01) |
| *H04N 23/661* | (2023.01) |
| *A01K 3/00* | (2006.01) |

(52) U.S. Cl.
CPC .............. *E06B 11/021* (2013.01); *B66D 1/46* (2013.01); *B66D 1/7489* (2013.01); *E04H 17/045* (2021.01); *E05F 15/627* (2015.01); *H04N 7/18* (2013.01); *H04N 23/661* (2023.01); *A01K 3/00* (2013.01)

(58) Field of Classification Search
CPC .... A01K 1/0017; A01K 3/00; E05Y 2900/40; E04H 17/045; E05F 15/627; B66D 1/46; B66D 1/7489; E06B 11/021; E01F 13/028; H04N 7/18; H04N 23/661
See application file for complete search history.

(56) References Cited

U.S. PATENT DOCUMENTS

| | | | | |
|---|---|---|---|---|
| 353,368 | A * | 11/1886 | Miller | B61L 29/026 49/93 |
| 484,572 | A * | 10/1892 | Rudert | E05F 13/04 49/34 |
| 1,832,812 | A * | 11/1931 | John | B61L 29/224 49/93 |
| 4,333,268 | A * | 6/1982 | Dumbeck | E01F 13/04 49/34 |
| 4,582,300 | A * | 4/1986 | Chappell | E04H 17/16 160/374 |
| 4,658,543 | A * | 4/1987 | Carr | B61L 29/04 49/192 |
| 4,858,383 | A * | 8/1989 | Kendig | E05F 15/641 49/362 |
| 5,245,787 | A * | 9/1993 | Swenson | E01F 13/028 49/34 |
| 5,452,542 | A * | 9/1995 | Bardwell | E01F 13/028 49/34 |

(Continued)

*Primary Examiner* — Justin B Rephann
(74) *Attorney, Agent, or Firm* — Harpman & Harpman

(57) ABSTRACT

A wire gate operational system providing remote opening and closing of a post and wire gate having a winch and cable assembly with a power source and an operational controller. A remote-control actuator provides long range remote operation to open and close the gate by controlled dropping and raising of the lead wire gate post by the winch. A bottom wire loop between a brace post and the lead wire post acts as a pivot point for the lead gate posts and interconnected directional end cut composite intermediate posts (dancers) allow for controlled wire gate lowering direction allowing ranchers and livestock to pass directly over the lower gate.

3 Claims, 4 Drawing Sheets

(56) References Cited

U.S. PATENT DOCUMENTS

| | | | | |
|---|---|---|---|---|
| 5,537,778 | A * | 7/1996 | Bardwell | E01F 13/028 49/34 |
| 6,042,046 | A * | 3/2000 | Beyer, Sr. | E04H 17/266 242/399.1 |
| 6,135,190 | A * | 10/2000 | Gompertz | E01F 13/028 49/34 |
| 6,186,274 | B1 * | 2/2001 | Reynolds | E04G 21/3261 182/138 |
| 6,192,627 | B1 * | 2/2001 | Gompertz | E01F 13/028 49/34 |
| 6,349,503 | B1 * | 2/2002 | Gompertz | E01F 13/028 49/34 |
| 6,485,225 | B1 * | 11/2002 | Baker | E01F 13/048 49/34 |
| 6,845,589 | B1 * | 1/2005 | Thompson | E01F 13/028 49/34 |
| 7,140,802 | B2 * | 11/2006 | Lamore | E01F 13/12 404/6 |
| 7,901,155 | B2 * | 3/2011 | Metzger | E01F 13/12 49/34 |
| 10,094,081 | B1 * | 10/2018 | Gill | E01F 13/028 |
| 11,484,005 | B2 * | 11/2022 | McNew | A01K 1/0035 |
| 2013/0209168 | A1 * | 8/2013 | Withers | E01F 13/12 404/6 |
| 2013/0221305 | A1 * | 8/2013 | Dilworth | A01K 1/0017 256/73 |
| 2018/0030759 | A1 * | 2/2018 | Chanbonpin | E05B 65/0007 |
| 2021/0079710 | A1 * | 3/2021 | Evans | E05F 15/73 |

\* cited by examiner

REMOTE WIRE GATE APPARATUS

This application claims the benefit of U.S. Provisional Application No. 63/208,566, filed Jun. 9, 2021.

BACKGROUND OF THE INVENTION

This invention relates to access gates, specifically wire fence gates that are comprised of multiple fence posts supporting multiple barb wire strands there between. Such gates are operated by releasing a "gate post" along with the remaining posts and attached wires so as to lay down the portion of the fence forming the gate on the ground allowing passage thereover.

1. Technical Field

This invention is related to wire fence gates found in livestock and large animal enclosures and boundaries.

2. Description of Prior Art

Prior art wire gates are well known in the cattle and ranch industry. Such gates are characterized by a section of wire (barbed wired) fence with wire support posts (dancers) that are not engaged in the ground allowing the gate portion of the fence section to be manually opened to allow livestock or animals there through.

There are no known prior art patents directed to a remote automated wire gate apparatus allowing the user to remotely open and close a wire gate section without direct contact with the gate.

SUMMARY OF THE INVENTION

A remote-controlled wire gate operating system having a power operated cable winch secured to a fence brace and post. Specialized gate posts and (dancers) are provided of durable synthetic material able to withstand heavy equipment crossing. The dancer posts all have angled ground engagement ends for directional control of the wire gate as it lays down in one direction while still connected to the remaining fence portion at one end. A remote-control transceiver and controller allow for remote hands-free operation with a battery and solar energizer panel to maintain its charge.

DETAILED DESCRIPTION OF THE INVENTION

Figure 1:
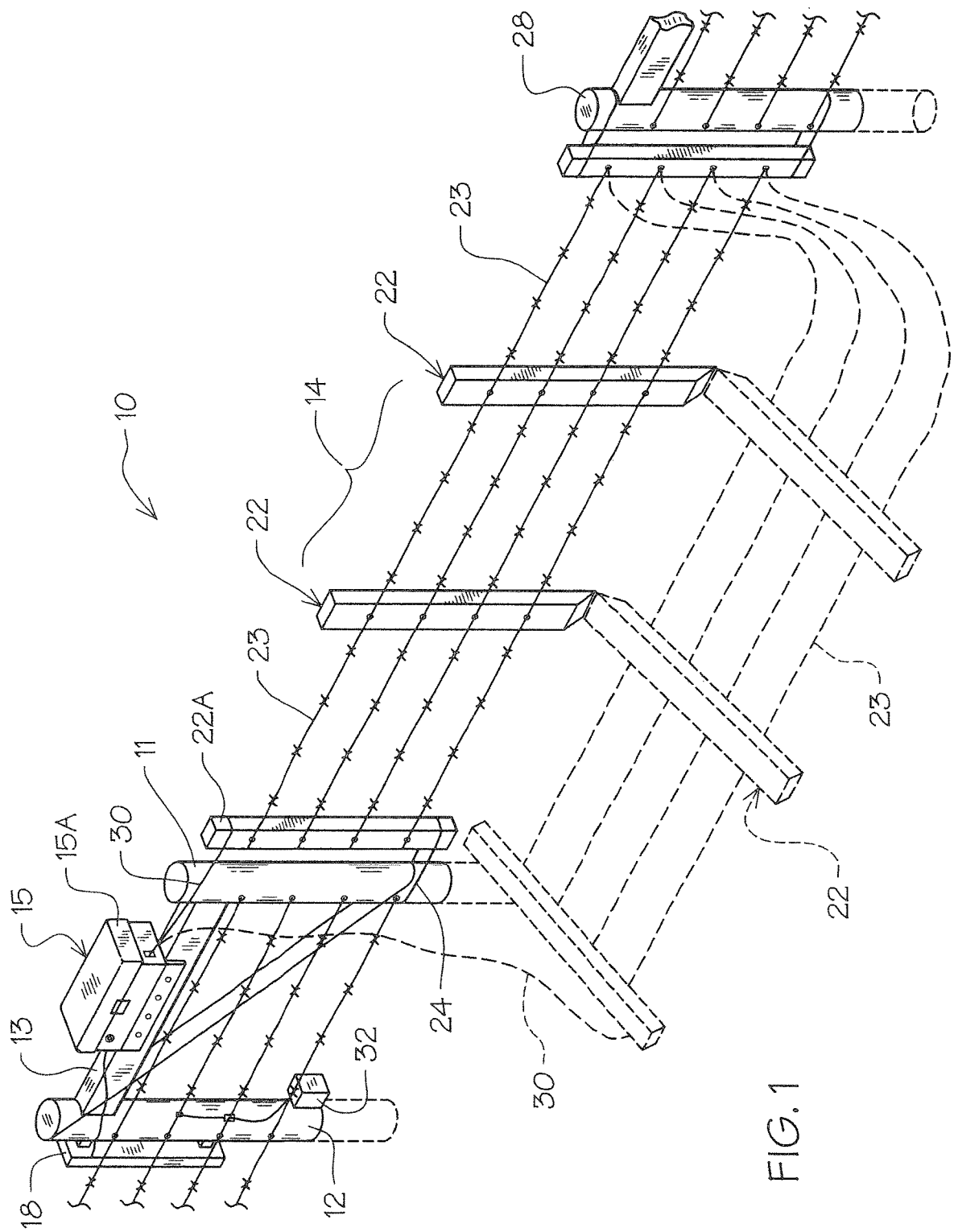
FIG. 1 is a perspective view of the remote-control wire gate system of the invention in closed upright position and in open position shown in dotted lines.
Figure 2:
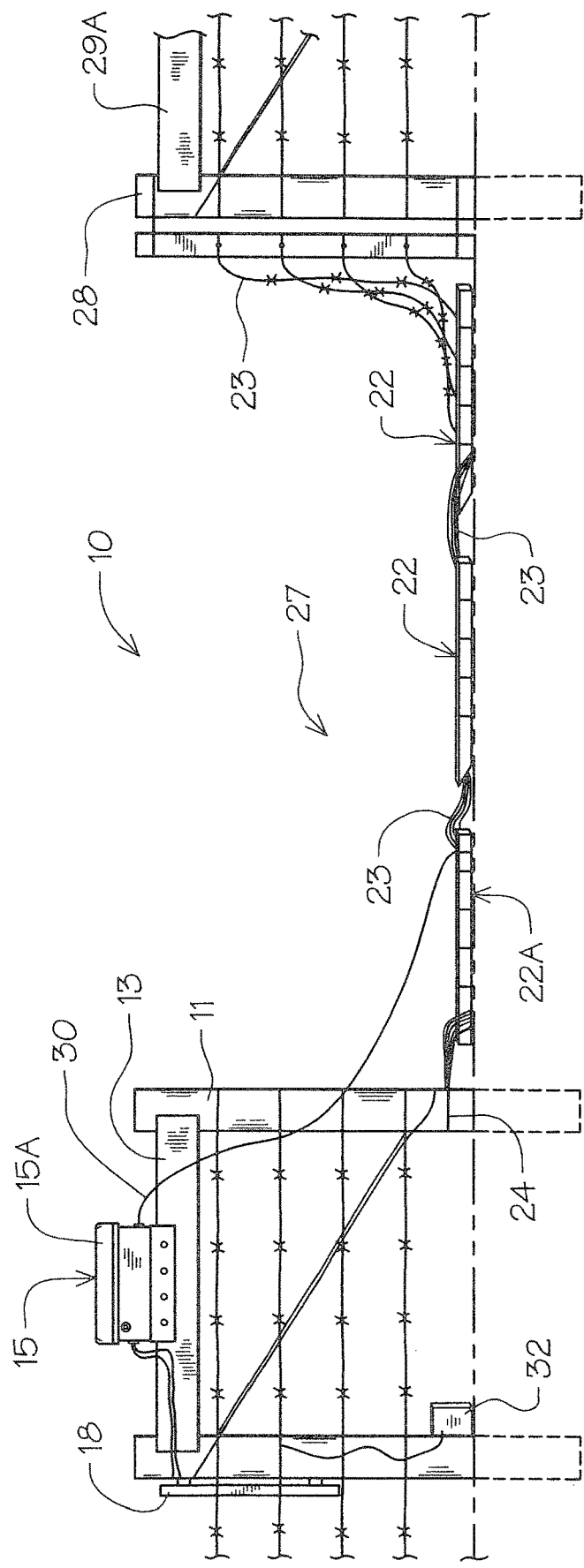
FIG. 2 is a side elevational view of the remote-control wire gate system with the gate portion in open access position on the ground.

Referring to FIGS. 1 and 2 of the drawings, a remote wire gate opening system 10 of the invention can be seen having a primary 11 and secondary brace post 12 with a cross brace 13 there between. A modified wire gate post assembly 14 is secured to the primary post 11. The wire gate opening system 10 of the invention includes a compact weather proof containment housing 15 with a hinge closure top 15A best seen in FIGS. 1-6 of the drawings.

A power cable winch 16 is secured within the housing 15 powered by a battery 17 as will be described in greater detail hereinafter. A solar panel 18 mounted on the post 12 maintains the battery charge providing an independent source of power for the gate system 10 as disclosed. A controller and activator within the housing 15 includes a wireless controller 19 having an internal antenna which provides selective activation to the power winch 16 by remote transmitter 21 determined to work a determined distance and if an optional cable antenna 17A is used a greater distance as will be well understood by those skilled in the art.

Referring now to FIGS. 1 and 6-8 of the drawings, the wire gate post assembly 14 can be seen having a plurality of spaced modified gate posts 22 with (dancers) interconnected by multiple barbed wire strands 23 extending there across.

A lead gate post 22A is secured to the primary stationary post 11 by a wire loop 24 on its lower portion acting as a live pivot hinge during operation as will be described hereinafter.

Figures 3, 4, 5, 6:
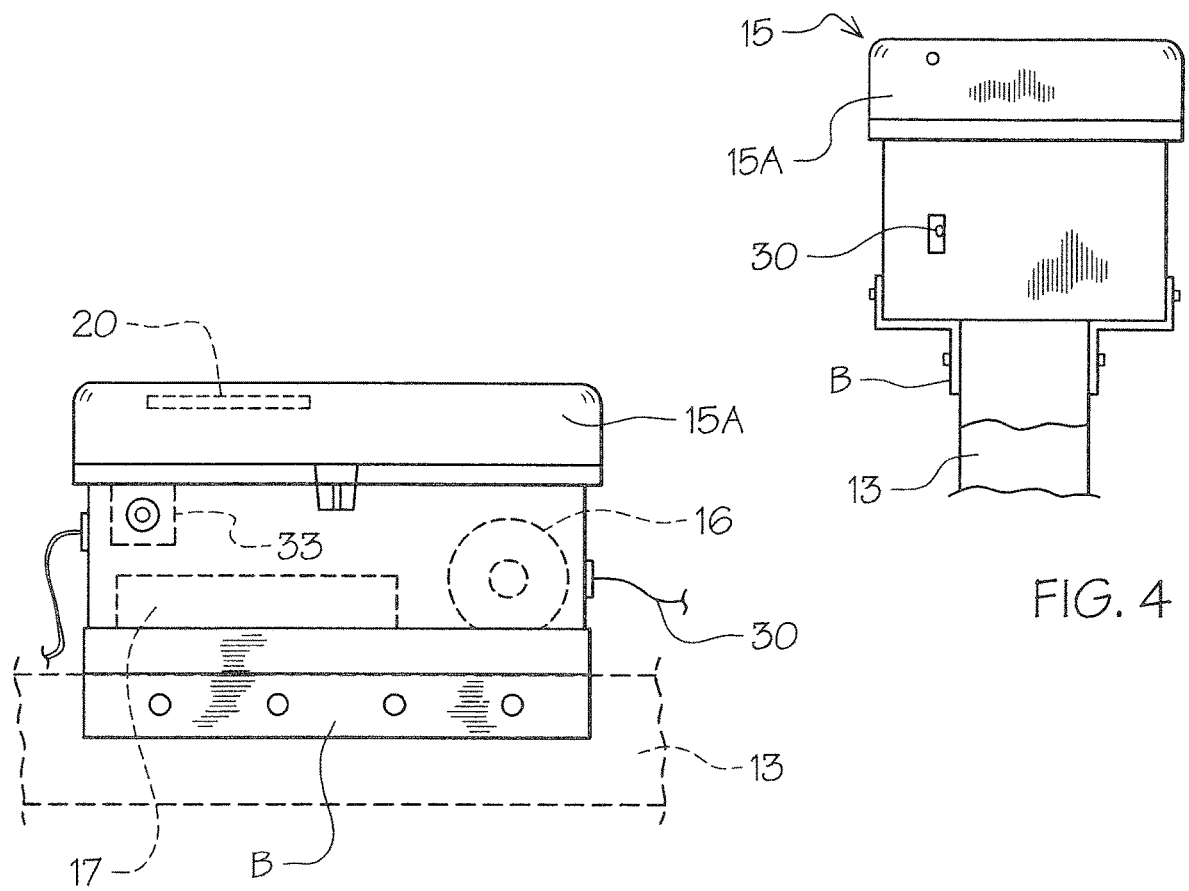
FIG. 3 is a side elevational view of the wire gate control and activation mounting enclosure.
FIG. 4 is an end elevational view thereof.
FIG. 5 is a top plan view thereof with portions broken away for illustration of the working components of the gate system.
FIG. 6 is a front elevational view of a remote-control transmitter.
Figure 9:
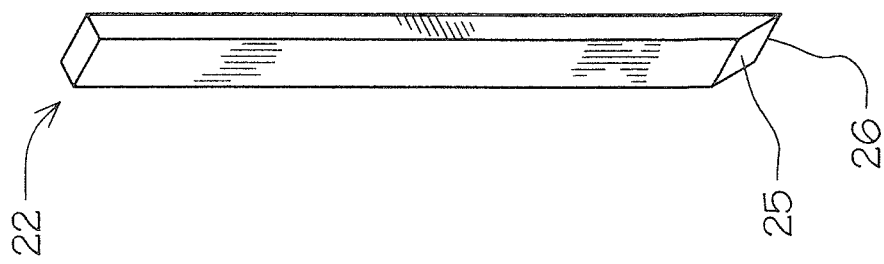
FIG. 9 is a perspective view of the gate post.
Figure 8:
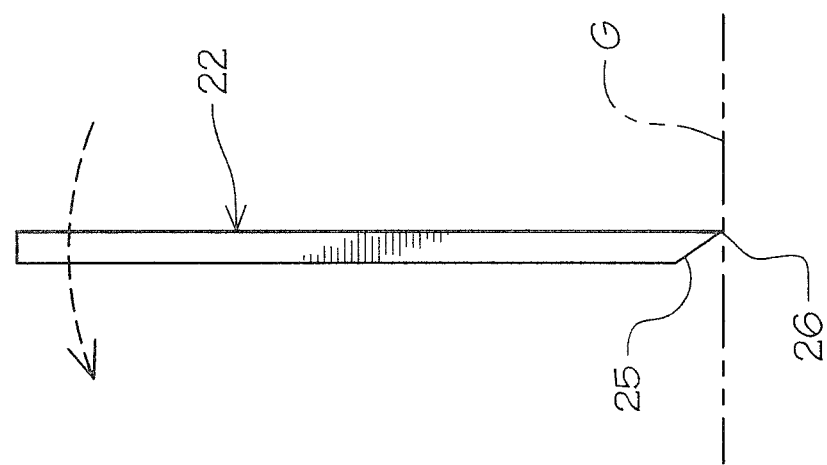
FIG. 8 is a side elevational view thereof.
Figure 7:
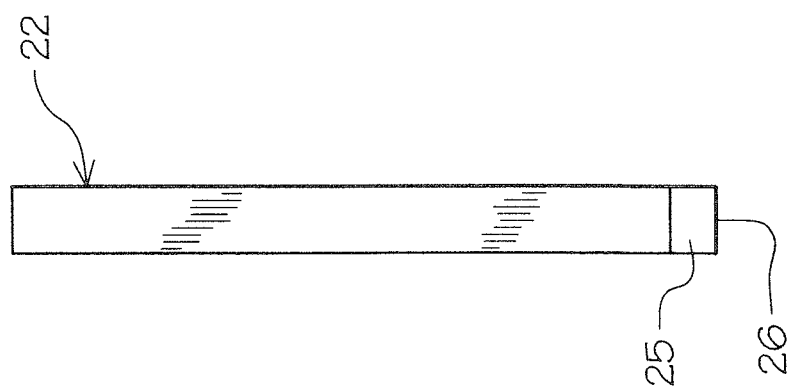
FIG. 7 is an enlarged front elevational view of the gate post.

Each of the gate post 22 are formed, in this example, of resilient composite material of high density and increased weight with the dancers having a special tapered end portion at 25, best seen in FIGS. 6-8 of the drawings, which has an angular inclination extending inwardly from the ground adjacent end of the post at 26 at a sufficient angle from the longitudinal axis of the post. This angular inclination of the tapered end portion 25 will assure that as the wire gate post assembly 14 when released from its vertical orientation, it will effectively fall in the direction as defined by the tapered end portion 25, as indicated in FIGS. 1 and 2 of the drawings allowing, in this example, livestock and vehicles, not shown, to cross over and through the now defined gate opening at 27.

The increased weight of the composite dancer post 22 helps the wire gate to fall and maintain a flat configuration on the ground for direct crossing by vehicles and livestock, not shown.

The composite posts act additionally as spacers for the barbed wire protecting vehicle's tires from direct contact therewith thereby eliminating the need to drag the wire gate clear of the opening as was required in prior art wire gates, not shown.

As in conventional wire fence gates, stationary and retaining posts 28 with a cross brace 29A provide support and continuation of the fence and a demarcation of the wire gate opening 27 there between.

The barb wire strands 23 from the gate post assembly 14 are secured to the retaining post 28 maintaining the gate continuity.

To activate and open the modified wire gate post assembly 14, a cable 30 extends from the power cable winch 16 to the top of the lead gate post 22A which secures the gate post 22A and the gate post assembly 14 in an upright vertical closed position.

Once remotely activated, the power cable winch 16 releases the cable 30 allowing the gate post assembly 14 to lay down flat in the desired direction of fall delineated by the angled ends 25 of the respective gate posts 22 (dancers) with the barb wire strands 23 remaining attached as seen in FIG. 2 and in broken lines in FIG. 1 of the drawings. The wire loop 24 acts as a live pivot hinge for the wire lead gate post 22A.

It will be seen that correspondingly to close the wire gate post assembly 14, the power cable winch 16 is remotely activated now retracting the cable 30 thereby lifting up and pulling the wire lead gate post 22A back into a nearly upright position adjacent the primary gate post 11 along with the wire attached posts 22 (dancers) into a closed position as seen in FIG. 1 of the drawings.

It will be evident from the above description that the cable winch 16 will be equipped with a limit switch to assure proper cable deployment and recovery as understood by those skilled in the art.

The activation and deactivation of the power cable winch 16 remotely is accomplished by a hand-held remote high megahertz transmitter 21, illustrated in FIG. 6 of the drawings for reference, which provides a command signal to the system controller for activation.

The wireless remote control and operation of the wire gate system of the invention 10 can be extended even farther when the jumper wire 17A is attached to the wire fence creating a new antenna with superior results.

An energizer 32 to electrify the gate and fence is connected to the gate wires and other areas that need protection through proximity and mercury switches mounted on the lead gate post 22A and to a grounding rod G connected to a battery, as understood to those in the art, to disconnect power when the gate is opening or as needed.

The compact weather proof containment housing 15 has a mounting bracket B an LTE camera 33 which provides remote surveillance of the gate through high-speed mobile or static communicators and recording. A power relay and electronic controller 34 are also provided in the housing 11 to accommodate the LTE camera 33, solar panel 18 and for battery charging and a transceiver 35 for activation of the winch 16 as hereinbefore described.

It will thus be seen that a new and novel wire gate remote gate opener and closer has been illustrated and described and it will be apparent to those skilled in the art that various changes and modifications may be made therein without departing from the spirit of the invention.

The invention claimed is:

1. An apparatus for remote fence gate operation comprising;
   a wire gate post assembly having a plurality of gate posts, some of said gate posts having contoured tapered end portions extending from a ground engagement end,
   a plurality of barb wire strands interlinking said gate posts together in spaced parallel longitudinal relation to one another, an electric energizer connected to the plurality of gate posts and the plurality of barbed wire strands,
   a live pivot hinge between a lead gate post and a primary brace post, said pivot hinge comprising a pinned wire loop extending about said lead gate post and said primary brace post adjacent the ground,
   a power cable winch in communication with said lead gate post, a source of independent power for said power cable winch, a remote-control transceiver and controller in communication with said power cable winch,
   a remote transmitter for wireless communication with said transceiver for activation of said power cable winch, said gate posts are made of resilient composite material.

2. The apparatus for remote fence gate operation set forth in claim 1 wherein said source of independent power comprises,
   batteries and a solar charging panel.

3. The apparatus for remote fence gate operation set forth in claim 1 wherein said power cable winch, source of independent power, remote control transceiver and controller are positioned in a weather tight housing on a cross brace extending from said primary post to a secondary post, an LTE surveillance camera in communication with said power source, said controller and a mobile communications network.

* * * * *